United States Patent
Philipossian et al.

(10) Patent No.: US 12,448,545 B2
(45) Date of Patent: Oct. 21, 2025

(54) SILICON CARBIDE (SIC) WAFER POLISHING WITH SLURRY FORMULATION AND PROCESS

(71) Applicant: Araca Inc., Tucson, AZ (US)

(72) Inventors: Ara Philipossian, Tucson, AZ (US); Yasa Sampurno, Tucson, AZ (US); Jason A. Keleher, Naperville, IL (US); Katherine Wortman-Otto, Minneapolis, MN (US); Abigail Linhart, Harvard, IL (US); Kiana A. Cahue, Joliet, IL (US)

(73) Assignee: Araca, Inc., Tucson, AZ (US)

( * ) Notice: Subject to any disclaimer, the term of this patent is extended or adjusted under 35 U.S.C. 154(b) by 34 days.

(21) Appl. No.: 18/556,230

(22) PCT Filed: May 10, 2022

(86) PCT No.: PCT/US2022/028536
§ 371 (c)(1),
(2) Date: Oct. 19, 2023

(87) PCT Pub. No.: WO2022/240842
PCT Pub. Date: Nov. 17, 2022

(65) Prior Publication Data
US 2024/0191101 A1    Jun. 13, 2024

Related U.S. Application Data

(60) Provisional application No. 63/188,305, filed on May 13, 2021.

(51) Int. Cl.
*C09G 1/02*    (2006.01)

(52) U.S. Cl.
CPC .................................. *C09G 1/02* (2013.01)

(58) Field of Classification Search
None
See application file for complete search history.

(56) References Cited

U.S. PATENT DOCUMENTS

| | | |
|---|---|---|
| 6,352,469 B1 | 3/2002 | Miyazaki et al. |
| 7,678,700 B2 | 3/2010 | Desai et al. |
| 7,998,866 B2 | 8/2011 | White et al. |
| 9,368,367 B2 | 6/2016 | Singh et al. |
| 10,040,972 B2 | 8/2018 | Yoshida et al. |
| 10,293,458 B2 * | 5/2019 | Lugg ................... C09K 3/1463 |
| 2001/0044265 A1 | 11/2001 | Kim et al. |

(Continued)

FOREIGN PATENT DOCUMENTS

| | | |
|---|---|---|
| CN | 106189872 A | 12/2016 |
| TW | 202112989 A | 4/2021 |

OTHER PUBLICATIONS

Yuan, et al. "Environment-Friendly Chemical Mechanical Polishing Slurry for SiC Wafer" Materials Science Forum, vol. 874, pp. 415-419, Oct. 3, 2016.

(Continued)

*Primary Examiner* — Eric W Golightly
(74) *Attorney, Agent, or Firm* — Schmeiser, Olsen & Watts LLP

(57) ABSTRACT

A method for polishing a silicon carbide surface. The silicon carbide surface is polished with a particulate abrasive while exposed to a composition of water, an oxidizing agent and an electrophile.

22 Claims, 5 Drawing Sheets

(56) References Cited

U.S. PATENT DOCUMENTS

| | | |
|---|---|---|
| 2003/0022502 A1 | 1/2003 | Matsui et al. |
| 2003/0077988 A1 | 4/2003 | Gotkis |
| 2006/0026906 A1 | 2/2006 | Stark et al. |
| 2006/0249482 A1 | 11/2006 | Wrschka et al. |
| 2008/0153293 A1 | 6/2008 | Desai et al. |
| 2009/0035942 A1 | 2/2009 | White et al. |
| 2009/0130849 A1 | 5/2009 | Lee |
| 2012/0094487 A1 | 4/2012 | Kranz et al. |
| 2017/0158911 A1 | 6/2017 | Fang |
| 2017/0321098 A1 | 11/2017 | Takahashi et al. |
| 2019/0010356 A1 | 1/2019 | Singh et al. |
| 2019/0010359 A1 | 1/2019 | Matsuyama et al. |
| 2019/0112506 A1 | 4/2019 | Ishibashi |
| 2020/0299546 A1 | 9/2020 | Kon et al. |
| 2021/0016415 A1 | 1/2021 | Kung et al. |
| 2021/0062042 A1 | 3/2021 | Fu et al. |

OTHER PUBLICATIONS

Narushima, et al. "High-Temperature Oxidation of Silicon Carbide and Silicon Nitride" Materials Transactions, vol. 38, No. 10, pp. 821-835, 1997.

Lee, et al. "Hybrid polishing mechanism of single crystal SiC using mixed-abrasive slurry (Mas)" CIRP Annals—Manufacturing Technology 59, pp. 333-336, 2010.

Okamoto, et al. "Improvement of Remval Rate in Abrasive-Free Planarization of 4H-SiC Substrates Using Catalytic Platinum and Hydrofluoric Acid" Japanese Journal of Applied Physics 51, 2012, 5 pages.

Bondokov, et al. "Influence of Structural Defects on the Polishing of Silison Carbide Single Crystal Wafers" Japanese Journal of Applied Physics, vol. 43, No. 1, pp. 43-49, 2004.

Chen, Zhaojie and Yonghua Zhao, "Investigation into electrochemical oxidation behavior of 4H-SiC with varying anodizing conditions" Electrochemistry Communications 109, Nov. 14, 2019, 9 pages.

Yuan, et al. "UV-TiO2 photocatalysis assisted chemical mechanical polishing 4H-SiC wafer" Materials and Manufacturing Processes, vol. 33, Iss. 11, Aug. 30, 2017. https://www.tandfonline.com/doi/full/10.1080/10426914.2017.1364855, 40 pages.

Shen, et al. "Ultrasmooth reaction-sintered silicon carbide surface resulting from combination of thermal oxidation and ceria slurry polishing" Optics Express, vol. 21, No. 12, Jun. 13, 2013, 9 pages.

Yagi et al. "Catalyst-referred etching of 4H-SiC substrate utilizing hydroxyl radicals generated from hydrogen peroxide molecules" Surface and Interface Analysis, 2008, 40, pp. 998-1001.

Liang, et al. "Catalysts based on Fenton reaction for SiC wafer in chemical magnetorheological finishing" AIMS Materials Science, 5(6), pp. 1112-1123, Nov. 15, 2018.

Kurokawa, et al. "Characteristics in SiC-CMP using MnO2 slurry with Strong Oxidant under Different Atmospheric Conditions" Mater. Res. Soc. Symp. Proc. vol. 1560, 2013, 9 pages.

Shi, et al. "Characterization of colloidal silica abrasives with different sizes and their chemical-mechanical polishing performance on 4H-SiC (0001)" Applied Surface Science 307, pp. 414-417, Apr. 15, 2014.

Lei, et al. "Comparison of Fe Catalyst Species in Chemical Mechanical Polishing Based on Fenton Reacton for SiC Wafer" Advanced Materials Research vol. 1027, pp. 171-176, Oct. 17, 2014.

Deng, et al. "Competition between surface modifcation and abrasive polishing: a method of controlling the surface atomic structure of 4H-SiC (0001)" Scientific Reports, 5, 8947, Mar. 10, 2015, 6 pages.

An, et al. "Effect of Process Parameters on Material removal Rate in Chemical Mechanical Polishing of 6H-SiC (0001)" Materials Science Forum vols. 600-603, pp. 831-834, Sep. 26, 2008.

Lagudu, Uma Rames Krishna and S.V. Babu, "Effect of Transition Metal Compounds on Amorphous SiC Removal Rates" ECS Journal of Solid State Science and Technology, 3 (6), pp. 219-225, May 15, 2014.

Neslen, et al. "Effects of Process Parameter Variations on the Removal Rate in Chemical Mechanical Polishing of 4H-SiC" Journal of Electronic Materials, vol. 30, No. 10, pp. 1271-1275, 2001.

Jorgensen, et al. "Effects of Water Vapor on Oxidation of Silicon Carbide" Journal of The American Ceramic Society, vol. 44, No. 6, pp. 258-261, Jun. 1961.

International Search Report and Written Opinion in PCT/US2022/028536 mailed on Jul. 28, 2022, 12 process.

Zhou, et al. "Chemical mechanical planarization (CMP) of on-axis Si-face SiC wafer using catalyst nano particles in slurry" Surface & Coatings Technology, vol. 251, pp. 48-55, Jul. 25, 2014.

Tsai, et al. "Investigation of increased removal rate during polishing of single-crystal silicon carbide" Int. J Adv Manuf Technol, Apr. 22, 2015, 10 pages.

Ho, et al. "Investigation of Polishing Pads Impregnated with Fe and Al2O3 Particles for Single-Cyrstal Silicon Carbide Wafers" Applied Sciences 6, 89, 2016, 8 pages.

Hara, et al. "Novel Abrasive-Free Planarization of 4H-SiC (0001) Using Catalyst" Journal of Electronic Materials vol. 35, No. 8, pp. L11-L14, 2006.

Gao, et al. "Novel polystyrene/CeO2-TiO2 multicomponent core/shell abrasives for high-efficiency and high-quality photocatalytic-assisted chemical mechanical polishing of reaction-bonded silicon carbide" Applied Surface Science 484, pp. 534-541, Apr. 4, 2019.

Chen, et al. "Performance of colloidal silica and ceria based slurries on CMP of Si-face 6H-SiC subtrates" Applied Surface Science 359, pp. 664-668, Oct. 26, 2015.

Kubota, et al. "Planarization of C-face 4H-SiC substrate using Fe particles and hydrogen peroxide solution" Precision Engineering 36, pp. 137-140, Sep. 16, 2011.

Kara, Hudai and Steve G. Roberts "Polishing Behavior and Surface Quality of Alumina and Alumina/Silison Carbide Nanocomposites" J. Am. Ceram. Soc. 83, pp. 1219-1225, 2000.

Lagudu, et al. "Role of ionic strength in chemical mechanical polishing of silicon carbide using silica slurries" Colloids and Surfaces A: Physicochemical and Engineering Aspects 445, pp. 119-127, Jan. 25, 2014.

Luthra, Krishan L. "Some New Perspectives on Oxidation of Silicon Carbide and Silicon Nitride" J. Am. Ceram. Soc. 74 (5), pp. 1095-1103, 1991.

Manivannan, R. and S. Ramanathan "The effect of hydrogen peroxide on polishing removal rate in CMP with varioud abrasives" Applied Surface Science 255, pp. 3764-3768, Oct. 22, 2008.

Lee, et al. "The Effect of Mixed Abrasive Slurry on CMP of 6H-SiC Substrate" Materials Science Forum Vo. 569, pp. 133-136, 2008.

Yin, et al. "The Effects of Strong Oxidixing Slurry and Processing Atmosphere on Double-sided CMP of SiC Wafer" Advanced Materials Research vols. 591-593, pp. 1131-1134, Nov. 29, 2012.

Chen, et al. "The role of interactions between abrasive particles and the substrate surface in chemical-mechanical planarization of Si-face 6H-SiC" RSC Advances 7, pp. 16938-16952, 2017.

Nguyen, et al. "The wear mechanisms of reaction bonded silicon carbide under abrasive polishing and slurry jet impact conditions" Wear, vols. 410-411, pp. 156-164, Sep. 15, 2018.

Zhu, et al. "Tribochemical polishing of silicon carbide in oxidant solution" Wear 225-229, pp. 848-856, 1999.

Kang, et al. "Effect of Catalyst Concentration on Chemical Mechanical Polishing Performance of Si Surface of 6H-SiC Wafer" Surface Technology, vol. 48, No. 3, 2019, pp. 291-296.

* cited by examiner

SILICON CARBIDE (SIC) WAFER POLISHING WITH SLURRY FORMULATION AND PROCESS

CROSS-REFERENCE TO RELATED APPLICATIONS

This application claims priority to and is a non-provisional of U.S. Patent Application 63/188,305 (filed May 13, 2021), the entirety of which is incorporated herein by reference.

BACKGROUND OF THE INVENTION

Manufacturing hard wide band-gap materials is limited by the rate of silicon carbide (SiC) removal. To increase removal rates, one must enable the formation of a soft, yet dense, oxide layer at the surface of the silicon carbide material. This layer is removed by mechanical abrasion (through hard abrasives and asperities on the surface of a polishing pad). Such mechanically abrasive processes tend to use very high working pressures and sliding velocities. The formation of this oxide layer is typically accomplished by the addition of the strong oxidizing agent potassium permanganate ($KMnO_4$) which weakens the surface forces on the silicon carbide substrate.

Due to the strong and corrosive nature of the permanganate, and also due to the fact that polishing equipment tends to get grossly discolored (e.g., turn purple) after extended exposure to permanganate, there is a strong desire on the part of industry to activate the silicon carbide surface with less aggressive conditions that will also enhance removal rates, cause no discoloration, while decreasing the final number of substrate-level defects. To date, no solution has been found to be entirely satisfactory.

The discussion above is merely provided for general background information and is not intended to be used as an aid in determining the scope of the claimed subject matter.

SUMMARY

A method for polishing a silicon carbide surface is provided. The silicon carbide surface is polished with a particulate abrasive while exposed to a composition of water, an oxidizing agent and an electrophile. The method provides material removal rates (MRR) that are competitive with, or superior to, conventional methods without utilizing harsh chemicals. An advantage that may be realized in the practice of some disclosed embodiments of the method is providing a material removal rate that is competitive with, or superior to, conventional $KMnO_4$ methods but which does not utilize such a strong, discoloring and corrosive reagent. The residual materials are also more environmentally friendly.

In a first embodiment, a method for polishing a silicon carbide surface is provided. The method comprising: exposing a silicon carbide surface to a composition comprising (1) water (2) an oxidizing agent (3) an electrophile and (4) a particulate abrasive; and polishing the silicon carbide surface while the silicon carbide surface is exposed to the composition.

In a second embodiment, a method for polishing a silicon carbide surface is provided. The method comprising: exposing a silicon carbide surface to a composition comprising (1) water (2) an oxidizing agent (3) a metal ion electrophile with a ligand and (4) a particulate abrasive; and polishing the silicon carbide surface while the silicon carbide surface is exposed to the composition.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

This disclosure provides slurry formulations for silicon carbide polishing with tunable performance upon the addition of certain additives that enhance removal rates under a less aggressive physicochemical environment. More specifically this disclosure provides formulations, as well as systems, that enhance the development of silicon carbide polishing processes and chemical-mechanical polishing (CMP) processes, including planarization, in particular.

Generally, the formulation comprises (1) water (2) a water-soluble electrophile ($E^+$) such as a metal ion chelated with a ligand via an Organometallic Complex Ligand Exchange (OMC-LE) or a non-metallic electrophile (3) an oxidizing agent (Ox) and (4) a particulate abrasive. The particulate abrasive, such as alumina is used at a pH above the isoelectric point (e.g. >2, such as a pH 4-5 or a pH of 8-9) while a mechanical polishing force is applied (e.g. between 3 psi and 7 psi (0.21 bar to 0.48 bar) applied by a rotating pad or brush). The abrasive is generally present in a concentration of about 2% to about 5% (wt/wt) and is water-insoluble. In one embodiment, the abrasive is alumina nanoparticles with an average diameter of less than 100 nm. In one embodiment, the formulation consists of the water-soluble electrophile, the oxidizing agent and water. In another embodiment, the abrasives are nanoparticles of silica, zirconia, titania, diamond or a metal oxide. The polishing method is generally performed at room temperature (e.g. between 20° C. and 25° C.).

Figure 1:
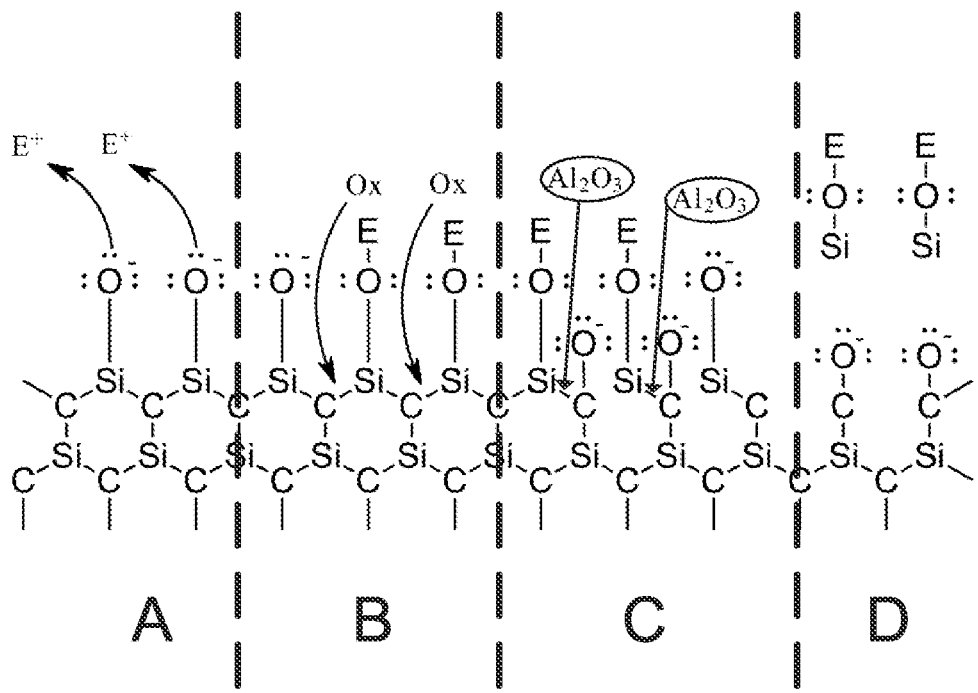
FIG. 1 is an illustration of activation of a silicon carbide surface using the disclosed method.

Without wishing to be bound by any particular theory, FIG. 1 depicts one possible mechanism to aid in understanding the disclosed method. Panel A of FIG. 1, shows an oxide surface of a silicon carbide substrate complexing with an water-soluble electrophile ($E^+$). The surface hydroxyl groups are deprotonated and highly anionic (i.e., they serve as a nucleophile) within a complexation layer between the additive-surface interface resulting in the weaking of the Si—C bonds. Panel B shows the activated surface being oxidizing by an oxidizing agent (Ox). In panel C, an abrasive (e.g. alumina) liberates the topmost silicon layer to produce the polished surface shown in panel D.

Examples of suitable oxidizing agents include hydrogen peroxide ($H_2O_2$), permanganate (e.g. $KMnO_4$ (KPS)) and persulfates such as ammonium persulfate (APS, $(NH_4)_2S_2O_8$). Without wishing to be bound to any particular theory, these oxidizing agents are believed to generate hydroxyl radicals in situ. The oxidizing agent is generally present in a concentration between 1% and 10% by weight. In one embodiment, the oxidizing agent is present in a concentration between 1% and 5% by weight. In yet another embodiment, the oxidizing agent is present in a concentration between 2% and 4% by weight.

Figure 2:
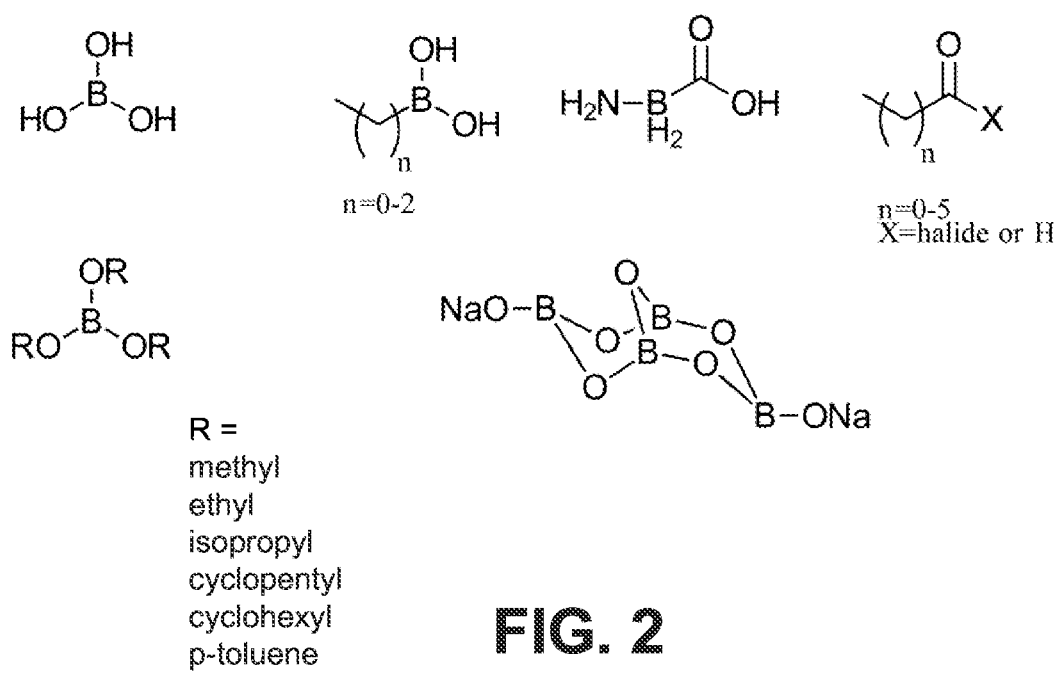
FIG. 2 depicts examples of non-metal electrophiles for use with the disclosed method.

Referring to FIG. 2, in one embodiment, the water-soluble electrophile is a non-metallic electrophile such as an aldehyde, an acyl halide (or carboxylic acid therefrom) or a boron-based compound. Examples of boron-based compounds include boronic acids such as ethylboronic acid, cyclopentylboronic acid, isopropylboronic acid, cyclohexylboronic acid, cyclopentylboronic acid, p-tolylboronic acid, phenylboronic acid, borax, or boric acid. Other suitable boron-based compounds include boroglycine or borates such as trimethyl borate or triethylborate. Due to the electron deficient nature of these supramolecular molecules, an enhanced nucleophilic attack from the silicon carbide substrate can occur.

In the case of OMC-LE, the $M^+$ center of the organometallic complex acts as the electrophile which undergoes the nucleophilic attack from the silicon carbide substrate. Furthermore, the organometallic complex facilitates the in situ formation of hydroxyl radicals from the oxidizing agent.

Examples of suitable metal ions include group II metals such as $Mg^{2+}$, $Ca^{2+}$, $Sr_{2+}$, $Ba^{2+}$ and divalent transition metals such as $Cu^{2+}$, $Zn^{2+}$. Further examples of suitable metal ions include $Fe^{3+}$, $Co^{3+}$, $Ti^{4+}$, $V^{4+}$, $V_{5+}$, $Cr_{6+}$, $Mo^{6+}$ and $Mn^{7+}$. Generally, the metal is water-soluble or is rendered water-soluble by complexation with the ligand or with a micelle. The metal is generally present in a concentration between 0.005% and 0.05% by weight. In another embodiment, the metal is present in a concentration between 0.005 and 0.015% by weight.

Figure 3:
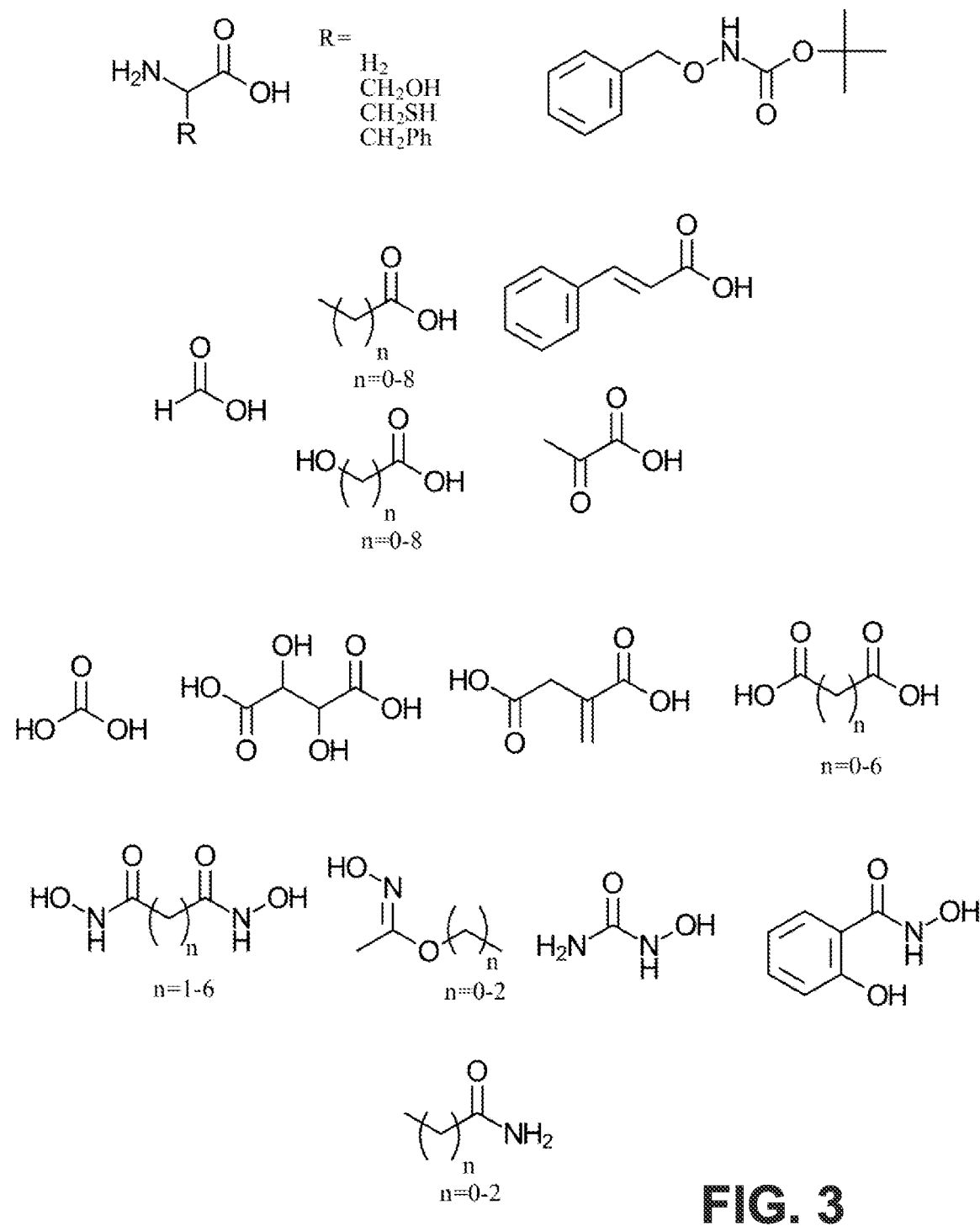
FIG. 3 depicts examples of various ligands for use with metal ion electrophiles.

Referring to FIG. 3, examples of suitable ligands include amino acids (e.g. glycine, serine, arginine, cystine, phenylalanine, etc.), monoprotic carboxylic acids (e.g. formic acid, acetic acid, glycolic acid, propionic acid, butanoic acid, hexanoic acid, heptanoic acid, octanoic acid, decanoic acid, pyruvic acid, t-cinnamic acid, etc.) diprotic carboxylic acids (e.g. carbonic acid, itaconic acid, malonic acid, tartaric acid, etc.), carbamates (e.g. tert-butyl N-(benzyloxy)carbamate), hydroxamic acids and hydroxamic esters (e.g. suberohydroxamic acid, salicylhydroxamic acid, ethyl acetohydroxamate), hydroxyurea and aliphatic amides (e.g. butyramide). Generally, the ligand is water-soluble. The ligand is present in a weight ratio of from about 1:5 to about 1:20 (metal:ligand). In another embodiment, the ligand is present in a weight ratio from about 1:8 to about 1:12 (metal:ligand). In yet another embodiment, the ligand is present in a weight ratio of 1:10 (metal:ligand).

Figure 4:
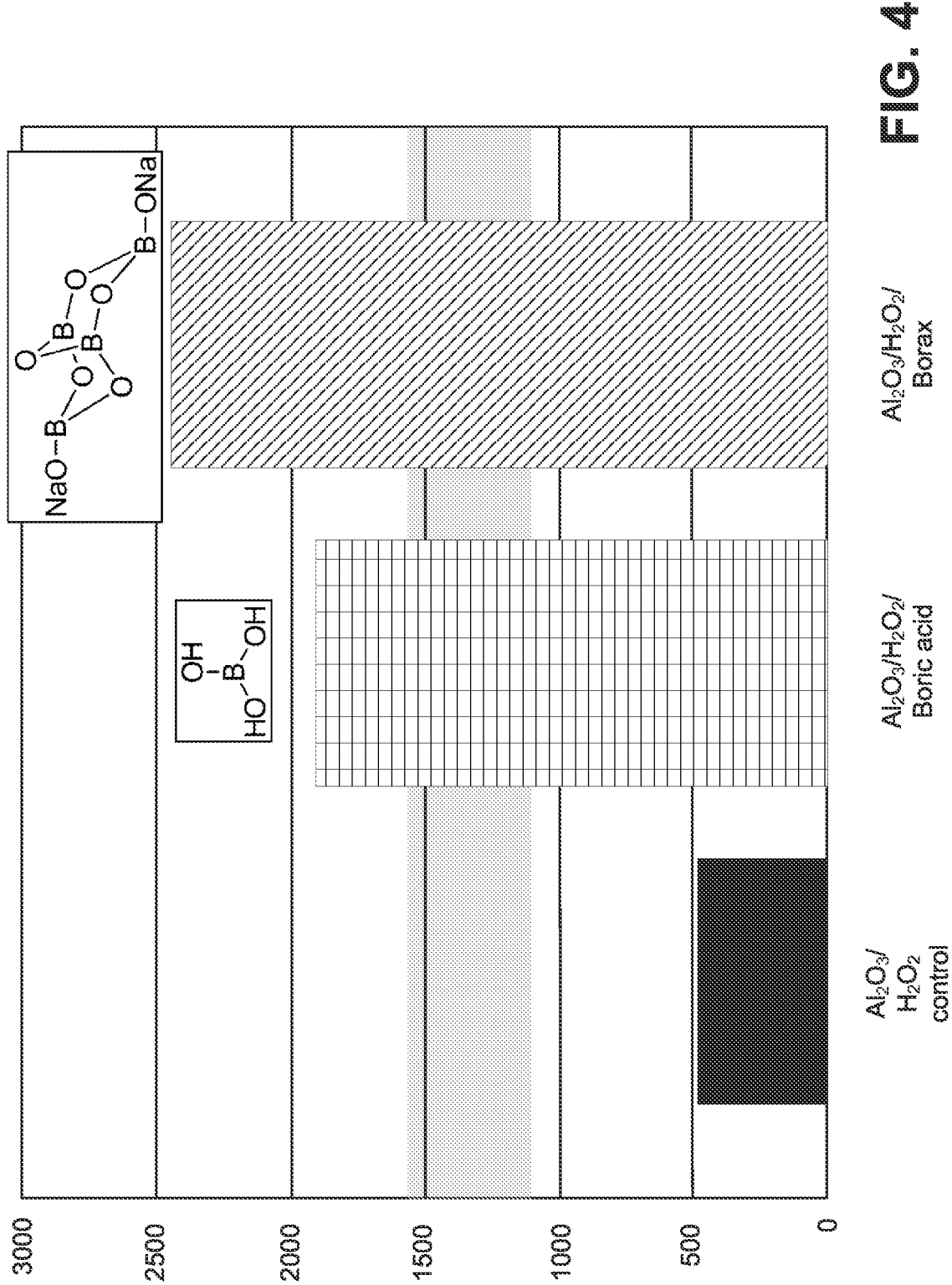
FIG. 4 is a graph depicting the material removal rate (MRR) of two non-metal electrophiles used with the disclosed method. Conventional ferro $KMnO_4$ MRR is shown in gray.
Figure 5:
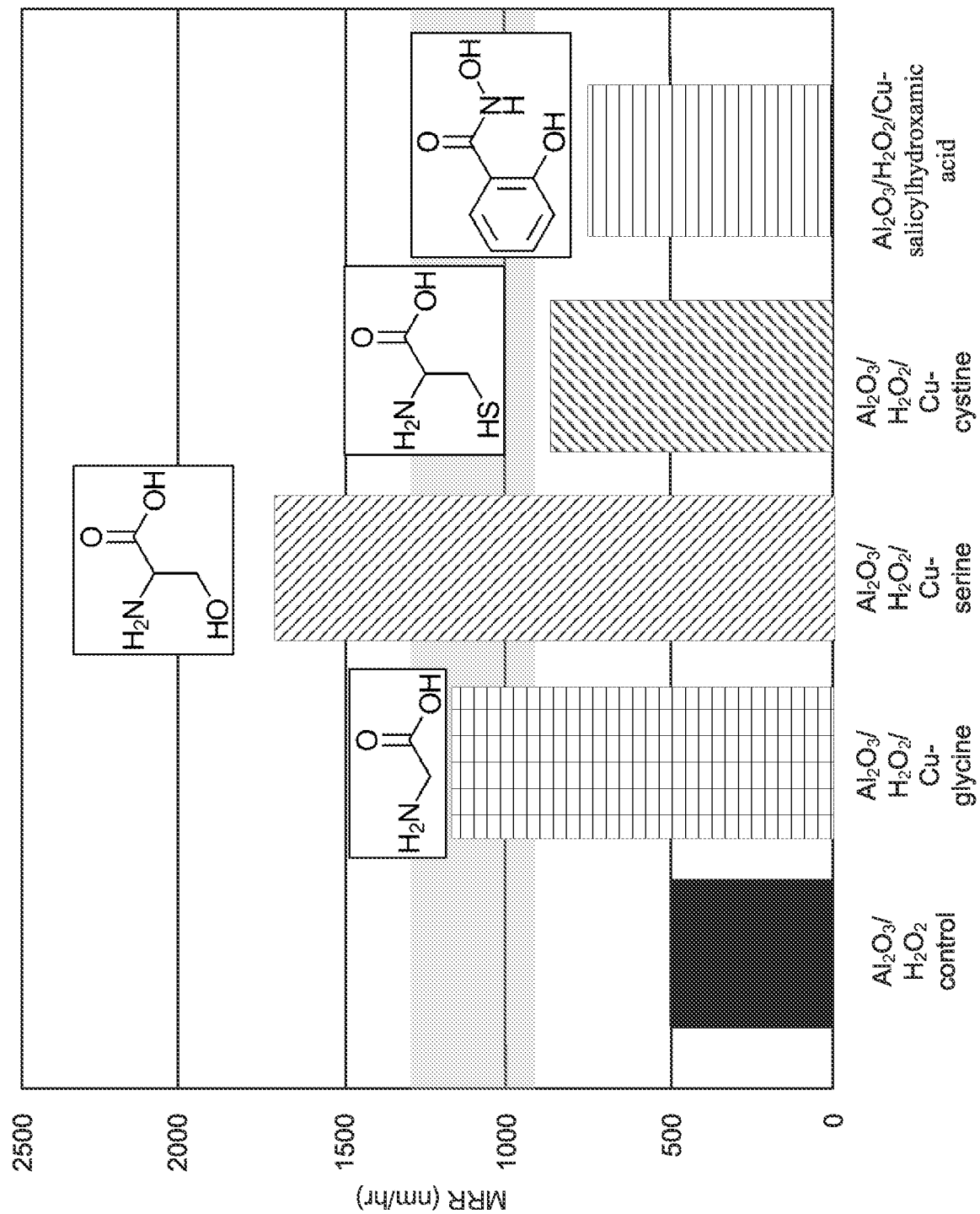
FIG. 5 is a graph depicting the material removal rate (MRR) of copper metal electrophiles used with four different ligands. Conventional ferro $KMnO_4$ MRR is shown in gray.
Figure 6:
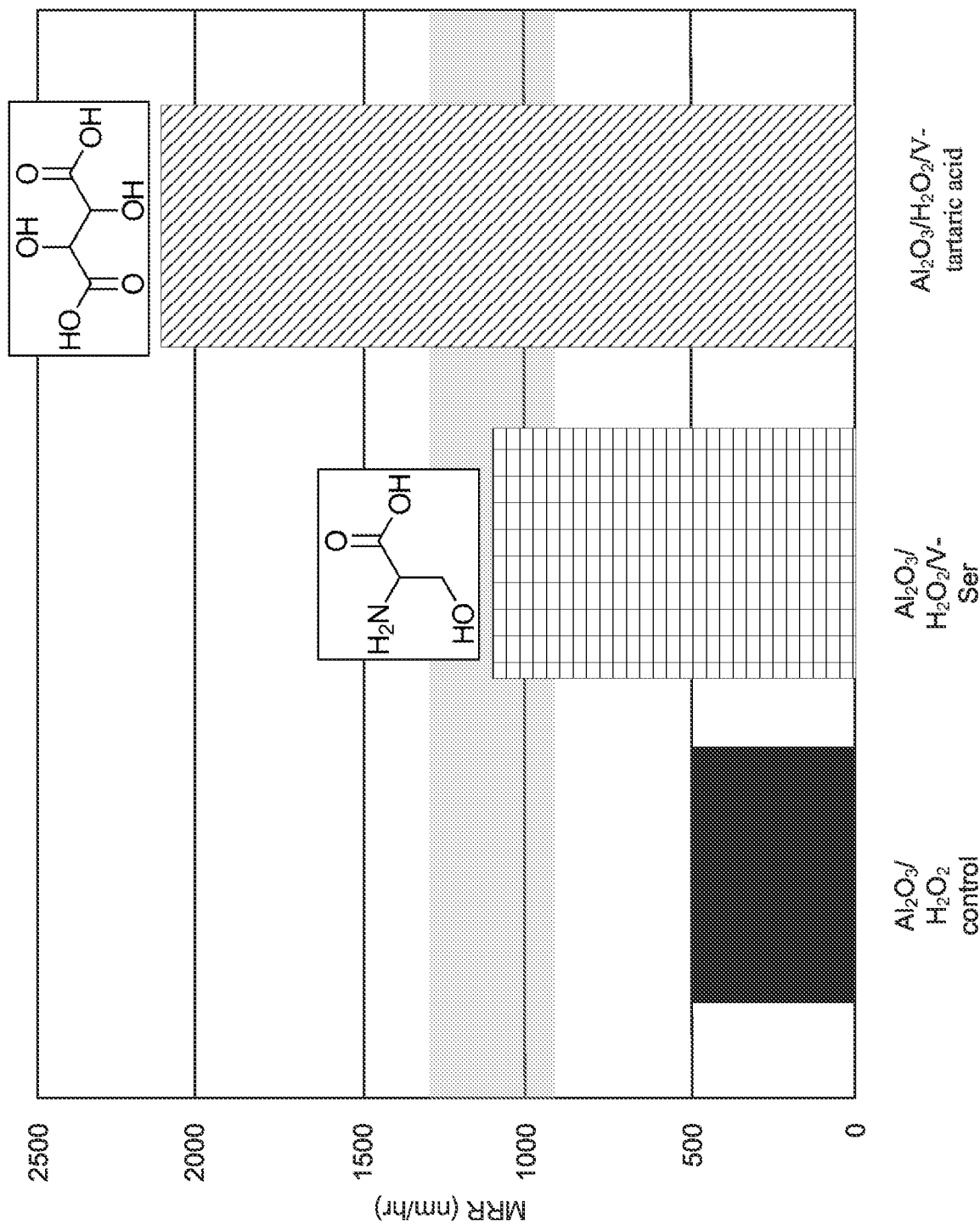
FIG. 6 is a graph depicting the material removal rate (MRR) of vanadium metal electrophiles used with two different ligands. Conventional ferro $KMnO_4$ MRR is shown in gray.

The disclosed compositions are competitive with conventional ferro $KMnO_4$ polishing techniques and, in some cases, have a superior material removal rate (MRR). FIGS. 4-6 depict typical MMR for conventional $KMnO_4$ shown in gray.

FIG. 4 depicts a control (see Example 1), a boric acid example (see Example 11) and a borax example (see Example 12). Both the Cu-boric acid and Cu-borax examples outperformed conventional $KMnO_4$ MRR (shown in gray) under identical conditions.

FIG. 5 depicts a control (see Example 1), and three copper-ligand examples including a glycine ligand (Example 2), a serine ligand (example 3), a cystine example (Example 5) and a salicylhydroxamic acid example (example 6). The Cu-serine outperforms conventional $KMnO_4$ MRR (shown in gray) under identical conditions. The Cu-glycine, Cu-cystine and Cu-salicylhydroxamic acid is competitive with conventional $KMnO_4$ techniques but avoids the drawbacks associated with these conventional reagents.

FIG. 6 depicts a control (see Example 1) and two vanadium-ligand examples including a serine ligand (Example 7) and a tartaric acid ligand (Example 8). The V-serine example is competitive with conventional ferro $KMnO_4$ techniques but avoids the drawbacks associated with these conventional reagents. The V-tartaric acid example outperforms conventional $KMnO_4$ MRR (shown in gray) under identical conditions with nearly double the material removal rate (MRR).

DETAILED EXAMPLES

All polishing trials were run on an Allied METPREP™ polisher, using a 100 mm diameter and a 350 mm thick 4H—SiC N-type wafer that was repeatedly re-polished. A Dupont SUBA® 800-II-12 X-Y grooved pad on a 200-mm rotating platen was used. The 3M (PB33A-1) bristle brush conditioning disc was used in an in-situ conditioning mode for the duration of the polish and for 1 minute during an ex-situ disc conditioning after the polish. The Si face of the wafer was polished for 10 minutes using a slurry that consisted of $\alpha$-$Al_2O_3$ nanoparticles (NPs), water, hydrogen peroxide, and the respective additives (organometallic complexes or electrophilic additives) as described in each example. The process pressure ranged between 3 and 7 PSI. The relative sliding velocity ranged between 0.25 to 1.05 m/s. Slurry flow rate was kept constant at 25 cc per minute. Examples are summarized in Table 1.

TABLE 1

| Example | H$_2$O$_2$ (wt %) | Al$_2$O$_3$ (wt %) | (wt %) | E$^+$ | Ligand (wt %) | Ligand |
|---|---|---|---|---|---|---|
| 1 | 3 | 3 | 0 | — | 0 | — |
| 2 | 3 | 3 | 0.01 | Cu$^{2+}$ | 0.1 | glycine |
| 3 | 3 | 5 | 0.01 | Cu$^{2+}$ | 0.1 | serine |
| 4 | 3 | 3 | 0.01 | Cu$^{2+}$ | 0.1 | serine |
| 5 | 3 | 3 | 0.01 | Cu$^{2+}$ | 0.1 | cystine |
| 6 | 3 | 3 | 0.01 | Cu$^{2+}$ | 0.1 | salicylhydroxamic acid |
| 7 | 3 | 3 | 0.01 | V$^{4+}$ | 0.1 | serine |
| 8 | 3 | 3 | 0.01 | V$^{4+}$ | 0.1 | tartaric acid |
| 9 | 3 | 3 | 0.02 | V$^{4+}$ | 0.1 | tartaric acid |
| 10 | 3 | 3 | 0.005 | V$^{4+}$ | 0.1 | tartaric acid |
| 11 | 3 | 3 | 1.0 | boric acid | — | — |
| 12 | 3 | 3 | 1.0 | borax | — | — |
| 13 | 5% ammonium persulfate | 3 | 0.01 | Cu$^{2+}$ | 0.1 | Serine |

Example 1—Control (Electrophile-Free)

A silicon carbide (SiC) slurry comprised of 3% α-Al$_2$O$_3$ nanoparticles (NPs), water, and 3% hydrogen peroxide was used for the experiment. A Dupont SUBA® 800-II-12 X-Y grooved pad on a 200-mm rotating platen was used. The 3M (PB33A-1) bristle brush conditioning disc was used in an in-situ conditioning mode for the duration of the polish and for 1 minute during ex-situ conditioning after the polish. The silicon face of 4H—SiC N-Type wafers having a 100 mm diameter and a thickness of 350 μm were polished. Process pressure ranged between 3 and 7 PSI. Sliding velocity was kept constant at 1.05 m/s. Slurry flow rate was kept constant at 25 cc per minute.

The observed SiC removal rates ranged from 348 to 532 nanometers per hour. At 3 PSI, SiC removal rates averaged at 348 nanometers per hour. A comparison at 7 PSI gave an average removal rate of 532 nanometers per hour, corresponding to an increase of 35% from the lower downforce.

Example 2—Cu$^{2+}$-Glycine

Example 2 was substantially identical to Example 1 except in that the silicon carbide (SiC) slurry was comprised of 3% α-Al$_2$O$_3$ nanoparticles (NPs), water, 3% hydrogen peroxide, and Cu$^{2+}$-glycine (0.01% metal, 0.1% ligand).

After polishing, and depending on the process conditions, the observed SiC removal rates ranged from ranged from 936 to 1,198 nanometers per hour. At 3 PSI, SiC removal rates averaged at 936 nanometers per hour. A comparison at 7 PSI gave an average removal rate of 1,198 nanometers per hour, corresponding to an increase of 22% from the lower downforce. See FIG. 5.

Example 3—Cu$^{2+}$-Serine with 5% Alumina

Example 3 was substantially identical to Example 1 except in that the silicon carbide (SiC) slurry was comprised of 5% α-Al$_2$O$_3$ nanoparticles (NPs), water, 3% hydrogen peroxide, and Cu$^{2+}$-serine (0.01% metal, 0.1% ligand).

After polishing and depending on the process conditions, the observed SiC removal rate of 1563 nanometers per hour at 7 PSI.

Example 4—Cu$^{2+}$-Serine with 3% Alumina

Example 4 was substantially identical to Example 1 except in that the silicon carbide (SiC) slurry was comprised of 3% α-Al$_2$O$_3$ nanoparticles (NPs), water, 3% hydrogen peroxide, and Cu$^{2+}$-serine (0.01% metal 0.1% ligand).

After polishing and depending on the process conditions, the observed SiC removal rates ranged from 1,371 to 1,709 nanometers per hour. At 3 PSI, SiC removal rates averaged at 1,371 nanometers per hour. A comparison at 7 PSI gave an average removal rate of 1,709 nanometers per hour, corresponding to an increase of 20% from the lower downforce. See FIG. 5.

Example 5—Cu$^{2+}$-Cystine

Example 5 was substantially identical to Example 1 except in that the silicon carbide (SiC) slurry was comprised of 3% α-Al$_2$O$_3$ nanoparticles (NPs), water, 3% hydrogen peroxide, and Cu$^{2+}$-cystine (0.01% metal, 0.1% ligand).

After polishing and depending on the process conditions, the observed SiC removal rates at 7 PSI, 1.05 sliding velocity and 25 cc/min flow rate was 883 nm/hr. See FIG. 5.

Example 6—Cu$^{2+}$-Salicylhydroxamic Acid

Example 6 was substantially identical to Example 1 except in that the silicon carbide (SiC) slurry was comprised of 3% α-Al$_2$O$_3$ nanoparticles (NPs), water, 3% hydrogen peroxide, and Cu$^{2+}$-salicylhydroxamic acid (0.01% metal, 0.1% ligand).

After polishing and depending on the process conditions, the observed SiC removal rates at 7 PSI, 1.05 sliding velocity and 25 cc/min flow rate was 753 nm/hr. See FIG. 5.

Example 7—V$^{4+}$-serine

Example 7 was substantially identical to Example 1 except in that the silicon carbide (SiC) slurry was comprised of 3% α-Al$_2$O$_3$ nanoparticles (NPs), water, 3% hydrogen peroxide, and V$^{4+}$-serine (0.01% metal, 0.1% ligand).

After polishing and depending on the process conditions, the observed SiC removal rates ranged from 926 to 1,132 nanometers per hour. At 3 PSI, SiC removal rates averaged at 926 nanometers per hour. A comparison at 7 PSI gave an average removal rate of 1,132 nanometers per hour, corresponding to an increase of 18% from the lower downforce. See FIG. 6.

Example 8—V$^{4+}$-Tartaric Acid

Example 8 was substantially identical to Example 1 except in that the silicon carbide (SiC) slurry was comprised of 3% α-Al$_2$O$_3$ nanoparticles (NPs), water, 3% hydrogen peroxide, and V$^{4+}$-tartaric acid (0.01% metal, 0.1% ligand).

After polishing and depending on the process conditions, the observed SiC removal rates ranged from 1,837 to 2,152 nanometers per hour. At 3 PSI, SiC removal rates averaged at 1,837 nanometers per hour. A comparison at 7 PSI gave an average removal rate of 2,152 nanometers per hour, corresponding to an increase of 15% from the lower downforce. See FIG. 6.

Example 9—V$^{4+}$-Tartaric Acid

Example 9 was substantially identical to Example 1 except in that the silicon carbide (SiC) slurry was comprised of 3% α-Al$_2$O$_3$ nanoparticles (NPs), water, 3% hydrogen peroxide, and V$^{4+}$-tartaric acid (0.02% metal, 0.1% ligand).

After polishing and depending on the process conditions, the observed SiC removal rates at 7 PSI, 1.05 sliding velocity and 25 cc/min flow rate was 999 nm/hr.

Example 10—$V^{4+}$-Tartaric Acid

Example 10 was substantially identical to Example 1 except in that the silicon carbide (SiC) slurry was comprised of 3% α-$Al_2O_3$ nanoparticles (NPs), water, 3% hydrogen peroxide, and $V^{4+}$-tartaric acid (0.05% metal, 0.1% ligand).

After polishing and depending on the process conditions, the observed SiC removal rates at 7 PSI, 1.05 sliding velocity and 25 cc/min flow rate was 1442 nm/hr.

Example 11—Boric Acid

Example 11 was substantially identical to Example 1 except in that the silicon carbide (SiC) slurry was comprised of 3.0% α-$Al_2O_3$ nanoparticles (NPs), water, 3.0% hydrogen peroxide, and 1.0% boric acid. See FIG. 4.

After polishing and depending on the process conditions, the observed SiC removal rates ranged from 1,427 to 1,904 nanometers per hour. At 3 PSI, SiC removal rates averaged at 1,427 nanometers per hour. A comparison at 7 PSI gave an average removal rate of 1,904 nanometers per hour, corresponding to an increase of 25% from the lower downforce.

Example 12—Borax

Example 12 was substantially identical to Example 1 except in that the silicon carbide (SiC) slurry was comprised of 3.0% α-$Al_2O_3$ nanoparticles (NPs), water, 3.0% hydrogen peroxide, and 1.0% borax.

After polishing and depending on the process conditions, the observed SiC removal rates at 7 PSI, 1.05 sliding velocity and 25 cc/min flow rate was 2446 nm/hr. See FIG. 4.

Example 13—Ammonium Persulfate

Example 13 was substantially identical to Example 1 except in that 5% ammonium persulfate was used instead of $H_2O_2$ and the pH was 4.0. The slurry comprised 3.0% α-$Al_2O_3$ nanoparticles (NPs), water, the aforementioned 5% (m/m) ammonium persulfate and $Cu^{2+}$-serine (0.01% metal 0.1% ligand).

After polishing and depending on the process conditions, the observed SiC removal rates ranged from 1,162 to 1,408 nanometers per hour. At 3 PSI, SiC removal rates averaged at 1,162 nanometers per hour. A comparison at 7 PSI gave an average removal rate of 1,408 nanometers per hour.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for polishing a silicon carbide surface, the method comprising:
   exposing a silicon carbide surface to a composition with a pH of 2-5, the composition comprising (1) water (2) an oxidizing agent (3) a metal ion electrophile with a ligand, the metal ion electrophile present in a concentration between 0.005 wt % and 0.05 wt %, based on a total weight of the composition, and the ligand being present in a metal:ligand weight ratio between 1:8 and 1:12, and (4) a particulate abrasive;
   and
   polishing the silicon carbide surface while the silicon carbide surface is exposed to the composition.

2. The method as recited in claim 1, wherein the oxidizing agent is hydrogen peroxide.

3. The method as recited in claim 1, wherein the metal ion electrophile is a divalent metal ion selected from a group consisting of $Mg^{2+}$, $Ca^{2+}$, $Sr^{2+}$, $Ba^{2+}$, $Cu^{2+}$, $Zn^{2+}$.

4. The method as recited in claim 1, wherein the metal ion electrophile is $Cu^{2+}$.

5. The method as recited in claim 1, wherein the metal ion electrophile is selected from a group consisting of $Fe^{3+}$, $Co^{3+}$, $Ti^{4+}$, $V^{4+}$, $V^{5+}$, $Cr^{6+}$, $Mo^{6+}$ and $Mn^{7+}$.

6. The method as recited in claim 1, wherein the metal ion electrophile is selected from a group consisting of $Co^{3+}$, $Ti^{4+}$, $V^{4+}$, $V^{5+}$, $Cr^{6+}$, $Mo^{6+}$ and $Mn^{7+}$.

7. The method as recited in claim 1, wherein the metal ion electrophile is $V^{4+}$ or $V^{5+}$.

8. The method as recited in claim 1, wherein the ligand is an amino acid.

9. The method as recited in claim 1, wherein the ligand is an amino acid selected from a group consisting of glycine, serine, arginine, cystine and phenylalanine.

10. The method as recited in claim 1, wherein the ligand is a monoprotic carboxylic acid.

11. The method as recited in claim 1, wherein the ligand is a monoprotic carboxylic acid selected from a group consisting of formic acid, acetic acid, glycolic acid, propionic acid, butanoic acid, hexanoic acid, heptanoic acid, octanoic acid, decanoic acid, pyruvic acid and t-cinnamic acid.

12. The method as recited in claim 1, wherein the ligand is a diprotic carboxylic acid.

13. The method as recited in claim 1, wherein the ligand is a diprotic carboxylic acid selected from a group consisting of carbonic acid, itaconic acid, malonic acid and tartaric acid.

14. The method as recited in claim 1, wherein the ligand is tartaric acid.

15. The method as recited in claim 1, wherein the ligand is a carbamate.

16. The method as recited in claim 1, wherein the ligand is a hydroxamic acid or a hydroxamic ester.

17. The method as recited in claim 1, wherein the ligand is a hydroxamic acid or a hydroxamic ester selected from a group consisting of suberohydroxamic acid, salicylhydroxamic acid and ethyl acetohydroxamate.

18. The method as recited in claim 1, wherein the ligand is an aliphatic amide.

19. The method as recited in claim 1, wherein the ligand is hydroxyurea.

20. The method as recited in claim 1, wherein the composition consists of the water, the oxidizing agent, the metal ion electrophile with ligand and the particulate abrasive.

21. The method as recited in claim 1, wherein the oxidizing agent is hydrogen peroxide, the metal ion electrophile is $V^{4+}$, and the ligand is tartaric acid.

22. The method as recited in claim 1, wherein oxidizing agent is hydrogen peroxide, the metal ion electrophile is $Cu2+$ and the ligand is an amino acid.

* * * * *